June 5, 1951    R. W. WEEKS    2,555,430
TOW CABLE
Filed Feb. 9, 1949
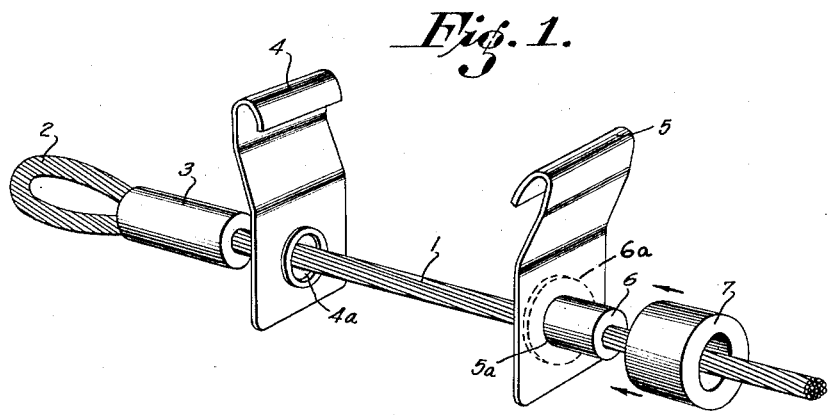
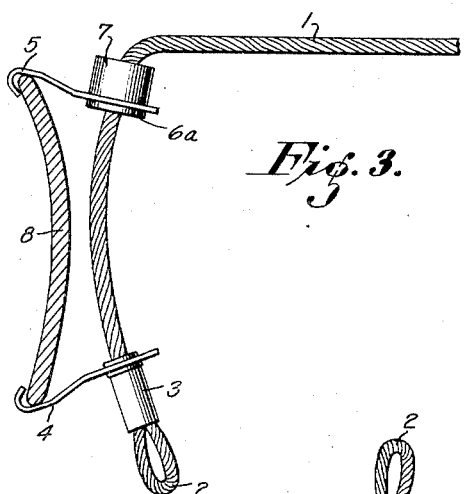
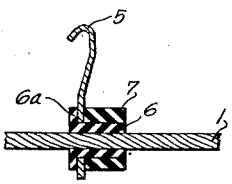
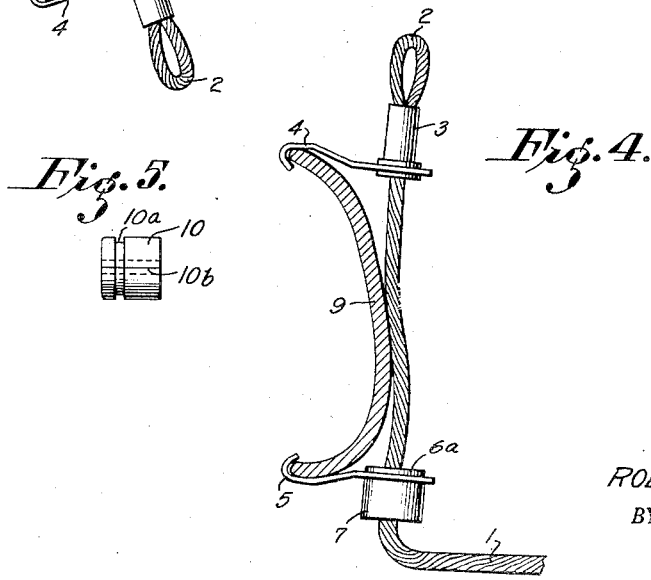
INVENTOR.
ROBERT W. WEEKS
BY Ralph B. Stewart
ATTORNEY Patented June 5, 1951

2,555,430

UNITED STATES PATENT OFFICE 2,555,430

TOW CABLE

Robert W. Weeks, West Chester, Pa., assignor to Wind Turbine Company, a corporation of Pennsylvania Application February 9, 1949, Serial No. 75,430

3 Claims. (Cl. 280—33.14)

This invention relates to tow cables and in particular to means for attaching the ends of the tow cable to the towing and towed vehicles.

An object of the invention is to provide an improved tow cable having a pair of hook elements slidably arranged on each end of the cable.

Another object of the invention is to provide an improved tow cable wherein one of each pair of hook elements is mounted on a bushing formed of rubber or similar resilient material in order to hold the hook element in position and enhance the gripping action of the hook on the cable while protecting the cable from injury.

A preferred embodiment of my invention is shown in the accompanying drawing in which:

Figure 1 is a perspective view of one end of my improved tow cable with one pair of hook elements thereon and with the bushing ring about to be positioned on the bushing;

Figure 2 is a sectional view showing the cable with the bushing, hook, and bushing ring assembled thereon;

Figure 3 is an elevational view of one end of the tow cable as it appears when attached to one type of bumper;

Figure 4 is an elevational view of one end of the tow cable as it appears when attached to a second type of bumper; and Figure 5 is a side elevational view of a modified form of bushing.

Figure 1 is on a somewhat larger scale than Figures 2 to 5.

Referring to the drawing, a tow cable 1 having a loop 2 formed on the end thereof by means of compressed sleeve 3 is shown having two hook elements 4 and 5 slidably mounted thereon with the cable 1 passing through holes 4a and 5a formed in the shank portion of the hook elements. These hook elements may be formed in any desired manner but in the present embodiment they are formed by bending a flat metal plate. If desired the portion having the hook formed thereon may have a coating of rubber or synthetic rubber bonded thereto for the purpose of preventing the hook from marring the member to which it is hooked.

These hook elements are mounted on the cable so they are facing each other and the hook element nearer the middle of the cable is mounted on a bushing 6 surrounding the cable 1 and having a flange 6a on its outer end. This bushing fits in the hole 5a in the shank portion of the hook element 5 and the shank portion is positioned adjacent the inner edge of the flange 6a. A cylindrical bushing ring 7 having an inside diameter equal to the outside diameter of the bushing 6 is slipped over the bushing and positioned so that its outer end is adjacent the inner side of the shank portion of the hook element 5. Bushing 6 grips the cable 1 with yielding contact which provides enough friction to hold the hook 5 in any position along the cable to which it may be moved.

The other end of the cable 1 has a second pair of hook elements mounted thereon in a similar manner. It will be obvious that the outer hook element 4 could be mounted by having the loop 2 pass through the hole 4a, or it may be permanently secured to the end of the cable in some other manner.

Figures 3 and 4 show the tow cable attached to an automobile bumper. In Figure 3 the hook element 5 that is mounted on the bushing 6 is hooked over the top edge of the bumper 8 and the hook element 4 is hooked over the bottom edge of the bumper. In this arrangement the tractive force is carried almost wholly by the hook element 5, the force exerted by hook element 4 being of a clamping nature. If the bushing 6 were not in the hook element 5 the cable 1 would be subjected to a sharp bend as it passed through the hole 5a and the stresses set up would probably damage the cable. Also, if the tension in the cable 1 were released the bend would straighten out somewhat and the cable would slide through the hook element 5 and loosen the hook element 4, allowing it to drop off the bumper 8. The bushing 6 eliminates both of these undesirable features by providing a yielding support around which the cable may bend without developing extreme stresses and by gripping the cable and preventing it from sliding through hook element 5 and loosening hook element 4 if the tension in the cable 1 is released.

Figure 4 shows the cable attached to a different type of bumper. Here the hook element 4 is attached to the upper edge of the bumper 9 and the hook element 5 is attached to the lower edge. In this arrangement a larger share of the tractive force is taken by hook element 4 than in the arrangement shown in Figure 3. Here again, however, if the bushing 6 were not present the cable 1 would be unduly stressed at the point where it passes through hook element 5, and if the tension were released in the cable the hook element 5 would be loosened and might fall off of the bumper 9. The bushing 6 eliminates these troublesome features in the same manner as was described in connection with Figure 3. The forces carried by the two hooks may be more nearly equalized by making hook 5 longer than hook 4.

The bushing 6 and the ring or sleeve 7 may be formed integrally as a single piece as shown at 10 in Figure 5. In this case the molded bushing would have a groove 10a for receiving the portion of hook 5 surrounding the hole 5a, and the bushing may be divided along the line 10b to facilitate its assembly or replacement on the cable. Since the bushing is formed of resilient material it may be deformed sufficiently to force one end through the hole 5a until the shank of the hook becomes seated in the groove 10a.

The bushing for holding the slidable hook in position may be formed of natural rubber or of similar resilient material, but it is preferred to form the bushing of neoprene which is not harmed by oil or grease.

I claim:

1. A tow cable comprising a cable, a pair of oppositely facing hook elements disposed on said cable, a cylindrical bushing formed of resilient material and having a flange on one end thereof slidably disposed on said cable, one of said hook elements being mounted on said bushing adjacent said flange, and a cylindrical ring of resilient material disposed about said bushing on the opposite side of said hook element from said flange.

2. A tow cable comprising a cable, a pair of oppositely facing hook elements disposed on said cable, one of said hook elements being located at the end of said cable, a bushing of resilient material surrounding said cable and being slidable thereon, said bushing having yielding gripping engagement with the cable and providing frictional contact with the cable sufficient to hold the bushing in any adjusted position, and the other of said hook elements having a shank portion surrounding said bushing, whereby said bushing provides a resilient slidable mounting for said other hook element upon said cable and protects said cable against injury by said other hook element.

3. A two cable according to claim 2 wherein said resilient bushing is formed of a cylindrical portion having spaced radial flanges and an intervening annular recess, the shank portion of said other hook element being seated within said annular recess.

ROBERT W. WEEKS.

REFERENCES CITED

The following references are of record in the file of this patent:

UNITED STATES PATENTS

| Number | Name | Date |
|---|---|---|
| 2,435,813 | Williams | Feb. 10, 1948 |